US011917391B2

(12) United States Patent
Wang et al.

(10) Patent No.: US 11,917,391 B2
(45) Date of Patent: Feb. 27, 2024

(54) AUDIO SIGNAL PROCESSING METHOD AND APPARATUS

(71) Applicant: HUAWEI TECHNOLOGIES CO., LTD., Guangdong (CN)

(72) Inventors: Bin Wang, Beijing (CN); Jonathan Alastair Gibbs, Cumbria (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/359,871

(22) Filed: Jun. 28, 2021

(65) Prior Publication Data

US 2021/0329399 A1 Oct. 21, 2021

Related U.S. Application Data

(63) Continuation of application No. PCT/CN2019/127656, filed on Dec. 23, 2019.

(30) Foreign Application Priority Data

Dec. 29, 2018 (CN) ......................... 201811637244.5

(51) Int. Cl.
*H04S 7/00* (2006.01)
*G10L 21/034* (2013.01)

(52) U.S. Cl.
CPC ............ *H04S 7/303* (2013.01); *G10L 21/034* (2013.01); *H04S 2420/01* (2013.01)

(58) Field of Classification Search
None
See application file for complete search history.

(56) References Cited

U.S. PATENT DOCUMENTS

2017/0366913 A1 12/2017 Stein et al.
2018/0077514 A1* 3/2018 Lee .......................... G01H 7/00
2018/0242094 A1* 8/2018 Baek ........................ H04R 5/04

FOREIGN PATENT DOCUMENTS

CN 101690150 A 3/2010
CN 104041081 A 9/2014
(Continued)

OTHER PUBLICATIONS

HTC, Recording video using Acoustic Focus, https://www.htc.com/uk/support/htcu11/howto/using-acoustic-focus.html, 3 pages.
(Continued)

*Primary Examiner* — Antim G Shah
(74) *Attorney, Agent, or Firm* — HUAWEI TECHNOLOGIES CO., LTD.

(57) ABSTRACT

In an audio signal processing method, a processing device obtains a current position relationship between a sound source and a listener. The processing device then obtains a current audio rendering function based on the current position relationship. When the current position relationship is different from a stored previous position relationship, the processing device adjusts an initial gain of the current audio rendering function based on the current position relationship and the previous position relationship, to obtain an adjusted gain of the current audio rendering function. The processing device then obtains an adjusted audio rendering function based on the current audio rendering function and the adjusted gain, and generates a current output signal based on a current input signal and the adjusted audio rendering function.

10 Claims, 9 Drawing Sheets

(56) References Cited

FOREIGN PATENT DOCUMENTS

| | | | |
|---|---|---|---|
| CN | 104869524 | A | 8/2015 |
| CN | 104919822 | A | 9/2015 |
| CN | 106162499 | A | 11/2016 |
| CN | 106463124 | A | 2/2017 |
| CN | 107182021 | A | 9/2017 |
| CN | 107734428 | A | 2/2018 |
| CN | 107852563 | A | 3/2018 |
| GB | 2554447 | A | 4/2018 |
| WO | 2016077514 | A1 | 5/2016 |
| WO | 2018060549 | A1 | 4/2018 |
| WO | 2018147701 | A1 | 8/2018 |
| WO | 2018200734 | A1 | 11/2018 |

OTHER PUBLICATIONS

Audio subgroup, Thoughts on MPEG-I Audio Requirements, International Organisation for Standardisation, Organisation Internationale De Normalisation ISO/IEC JTC1/SC29/WG11, Coding of Moving Pictures and Audio, ISO/IEC JTC1/SC29/WG11 MPEG2018/ N17647 , Apr. 2018, San Diego, US, 7 pages.

* cited by examiner

AUDIO SIGNAL PROCESSING METHOD AND APPARATUS

CROSS-REFERENCE TO RELATED APPLICATIONS

This application is a continuation of International Application No. PCT/CN2019/127656, filed on Dec. 23, 2019, which claims priority to Chinese Patent Application No. 201811637244.5, filed on Dec. 29, 2018. The disclosures of the aforementioned applications are hereby incorporated by reference in their entirety.

TECHNICAL FIELD

Embodiments of this application relate to the signal processing field, and in particular, to an audio signal processing method and apparatus.

BACKGROUND

With rapid development of high-performance computers and signal processing technologies, people raise increasingly high requirements for voice and audio experience. Immersive audio can meet people's requirements for the voice and audio experience. For example, increasing attention is paid to application of a 4G/5G communication voice, an audio service, and virtual reality (virtual reality, VR). An immersive virtual reality system requires not only a stunning visual effect, but also a realistic audio effect. Audio-visual fusion can greatly improve experience of virtual reality. A core of virtual reality audio is three-dimensional audio. Currently, a three-dimensional audio effect is usually implemented by using a reproduction method, for example, a headphone-based binaural reproduction method. In the conventional technology, when a listener moves, energy of an output signal (a binaural input signal) may be adjusted to obtain anew output signal. When the listener only turns the head but does not move, the listener can only sense a direction change of sound emitted by a sound source, but cannot notably distinguish between volume of the sound in front of the listener and volume of the sound behind the listener. This phenomenon is different from actual feeling that volume of the actually sensed sound is highest when the listener faces the sound source in the real world and that volume of the actually sensed sound is lowest when the listener faces away from the sound source. If the listener listens to the sound for a long time, the listener feels very uncomfortable. Therefore, how to adjust the output signal based on a head turning change of the listener and/or a position movement change of the listener to improve an auditory effect of the listener is an urgent problem to be resolved.

SUMMARY

Embodiments of this application provide an audio signal processing method and apparatus, to resolve a problem about how to adjust an output signal based on a head turning change of a listener and/or a position movement change of the listener to improve an auditory effect of the listener.

To achieve the foregoing objective, the following technical solutions are used in the embodiments of this application.

According to a first aspect, an embodiment of this application provides an audio signal processing method. The method may be applied to a terminal device, or the method may be applied to a communication apparatus that can support a terminal device to implement the method. For example, the communication apparatus includes a chip system, and the terminal device may be a VR device, an augmented reality (augmented reality, AR) device, or a device with a three-dimensional audio service. The method includes: after obtaining a current position relationship between a sound source at a current moment and a listener, determining a current audio rendering function based on the current position relationship; if the current position relationship is different from a stored previous position relationship, adjusting an initial gain of the current audio rendering function based on the current position relationship and the previous position relationship, to obtain an adjusted gain of the current audio rendering function; determining an adjusted audio rendering function based on the current audio rendering function and the adjusted gain; and determining a current output signal based on a current input signal and the adjusted audio rendering function. The previous position relationship is a position relationship between the sound source at a previous moment and the listener. The current input signal is an audio signal emitted by the sound source, and the current output signal is used to be output to the listener. According to the audio signal processing method provided in this embodiment of this application, a gain of the current audio rendering function is adjusted based on a change in a relative position of the listener relative to the sound source and a change in an orientation of the listener relative to the sound source that are obtained through real-time tracking, so that a natural feeling of a binaural input signal can be effectively improved, and an auditory effect of the listener is improved.

With reference to the first aspect, in a first possible implementation, the current position relationship includes a current distance between the sound source and the listener, or a current azimuth of the sound source relative to the listener; or the previous position relationship includes a previous distance between the sound source and the listener, or a previous azimuth of the sound source relative to the listener.

With reference to the first possible implementation, in a second possible implementation, if the listener only moves but does not turn the head, that is, when the current azimuth is the same as the previous azimuth and the current distance is different from the previous distance, the adjusting an initial gain of the current audio rendering function based on the current position relationship and the previous position relationship, to obtain an adjusted gain of the current audio rendering function includes: adjusting the initial gain based on the current distance and the previous distance to obtain the adjusted gain.

Optionally, the adjusting the initial gain based on the current distance and the previous distance to obtain the adjusted gain includes: adjusting the initial gain based on a difference between the current distance and the previous distance to obtain the adjusted gain; or adjusting the initial gain based on an absolute value of a difference between the current distance and the previous distance to obtain the adjusted gain.

For example, if the previous distance is greater than the current distance, the adjusted gain is determined by using the following formula: $G_2(\theta)=G_1(\theta)\times(1+\Delta r)$, where $G_2(\theta)$ represents the adjusted gain, $G_1(\theta)$ represents the initial gain, $\theta$ is equal to $\theta_1$, $\theta_1$ represents the previous azimuth, and $\Delta r$ represents the absolute value of the difference between the current distance and the previous distance, or $\Delta r$ represents a difference obtained by subtracting the current distance from the previous distance; or if the previous distance is less than the current distance, the adjusted gain is determined by using the following formula: $G_2(\theta)=G_1(\theta)/(1+\Delta r)$, where $\theta$ is equal to $\theta_1$, $\theta_1$ represents the previous azimuth, and $\Delta r$ represents an absolute value of a difference between the previous distance and the current distance, or $\Delta r$ represents a difference obtained by subtracting the previous distance from the current distance.

With reference to the first possible implementation, in a third possible implementation, if the listener only turns the head but does not move, that is, when the current distance is the same as the previous distance and the current azimuth is different from the previous azimuth, the adjusting an initial gain of the current audio rendering function based on the current position relationship and the previous position relationship, to obtain an adjusted gain of the current audio rendering function includes: adjusting the initial gain based on the current azimuth to obtain the adjusted gain.

For example, the adjusted gain is determined by using the following formula: $G_2(\theta)=G_1(\theta)\times\cos(\theta/3)$, where $G_2(\theta)$ represents the adjusted gain, $G_1(\theta)$ represents the initial gain, $\theta$ is equal to $\theta_2$, and $\theta_2$ represents the current azimuth.

With reference to the first possible implementation, in a fourth possible implementation, if the listener not only turns the head but also moves, that is, when the current distance is different from the previous distance and the current azimuth is different from the previous azimuth, the adjusting an initial gain of the current audio rendering function based on the current position relationship and the previous position relationship, to obtain an adjusted gain of the current audio rendering function includes: adjusting the initial gain based on the previous distance and the current distance to obtain a first temporary gain, and adjusting the first temporary gain based on the current azimuth to obtain the adjusted gain; or adjusting the initial gain based on the current azimuth to obtain a second temporary gain, and adjusting the second temporary gain based on the previous distance and the current distance to obtain the adjusted gain.

With reference to the foregoing possible implementations, in a fifth possible implementation, the initial gain is determined based on the current azimuth, and a value range of the current azimuth is from 0 degrees to 360 degrees.

For example, the initial gain is determined by using the following formula: $G_1(\theta)=A\times\cos(\pi\times\theta/180)-B$, where $\theta$ is equal to $\theta_2$, $\theta_2$ represents the current azimuth, $G_1(\theta)$ represents the initial gain, A and B are preset parameters, a value range of A is from 5 to 20, and a value range of B is from 1 to 15.

With reference to the foregoing possible implementations, in a sixth possible implementation, the determining a current output signal based on a current input signal and the adjusted audio rendering function includes: determining, as the current output signal, a result obtained by performing convolution processing on the current input signal and the adjusted audio rendering function.

It should be noted that the foregoing current input signal is a mono signal or a stereo signal. In addition, the audio rendering function is a head related transfer function (Head Related Transfer Function, HRTF) or a binaural room impulse response (Binaural Room Impulse Response, BRIR), and the audio rendering function is a current audio rendering function or an adjusted audio rendering function.

According to a second aspect, an embodiment of this application further provides an audio signal processing apparatus. The audio signal processing apparatus is configured to implement the method described provided in the first aspect. The audio signal processing apparatus is a terminal device or a communication apparatus that supports a terminal device to implement the method described in the first aspect. For example, the communication apparatus includes a chip system. The terminal device may be a VR device, an AR device, or a device with a three-dimensional audio service. For example, the audio signal processing apparatus includes an obtaining unit and a processing unit. The obtaining unit is configured to obtain a current position relationship between a sound source at a current moment and a listener. The processing unit is configured to determine a current audio rendering function based on the current position relationship obtained by the obtaining unit. The processing unit is further configured to: if the current position relationship is different from a stored previous position relationship, adjust an initial gain of the current audio rendering function based on the current position relationship obtained by the obtaining unit and the previous position relationship, to obtain an adjusted gain of the current audio rendering function. The processing unit is further configured to determine an adjusted audio rendering function based on the current audio rendering function and the adjusted gain. The processing unit is further configured to determine a current output signal based on a current input signal and the adjusted audio rendering function. The previous position relationship is a position relationship between the sound source at a previous moment and the listener. The current input signal is an audio signal emitted by the sound source, and the current output signal is used to be output to the listener.

Optionally, a specific implementation of the audio signal processing method is the same as that in the corresponding description in the first aspect, and details are not described herein again.

It should be noted that the functional modules in the second aspect may be implemented by hardware, or may be implemented by hardware by executing corresponding software. The hardware or the software includes one or more modules corresponding to the foregoing functions, for example, a sensor, configured to complete a function of the obtaining unit; a processor, configured to complete a function of the processing unit, and a memory, configured to store program instructions used by the processor to process the method in the embodiments of this application. The processor, the sensor, and the memory are connected and implement mutual communication through a bus. For details, refer to functions implemented by the terminal device in the method described in the first aspect.

According to a third aspect, an embodiment of this application further provides an audio signal processing apparatus. The audio signal processing apparatus is configured to implement the method described in the first aspect. The audio signal processing apparatus is a terminal device or a communication apparatus that supports a terminal device to implement the method described in the first aspect. For example, the communication apparatus includes a chip system. For example, the audio signal processing apparatus includes a processor, configured to implement the functions in the method described in the first aspect. The audio signal processing apparatus may further include a memory, configured to store program instructions and data. The memory is coupled to the processor. The processor can invoke and execute the program instructions stored in the memory, to implement the functions in the method described in the first aspect. The audio signal processing apparatus may further include a communication interface. The communication interface is used by the audio signal processing apparatus to communicate with another device. For example, if the audio signal processing apparatus is a terminal device, the another device is a sound source device that provides an audio signal.

Optionally, a specific implementation of the audio signal processing method is the same as that in the corresponding description in the first aspect, and details are not described herein again.

According to a fourth aspect, an embodiment of this application further provides a computer-readable storage medium, including computer software instructions. When the computer software instructions are run in an audio signal processing apparatus, the audio signal processing apparatus is enabled to perform the method described in the first aspect.

According to a fifth aspect, an embodiment of this application further provides a computer program product including instructions. When the computer program product is run in an audio signal processing apparatus, the audio signal processing apparatus is enabled to perform the method described in the first aspect.

According to a sixth aspect, an embodiment of this application provides a chip system. The chip system includes a processor, and may further include a memory, configured to implement functions of the terminal device or the communication apparatus in the foregoing methods. The chip system may include a chip, or may include a chip and another discrete component.

In addition, for technical effects brought by designed implementations of any one of the foregoing aspects, refer to technical effects brought by different designed implementations of the first aspect. Details are not described herein again.

In the embodiments of this application, the name of the audio signal processing apparatus constitutes no limitation on the device. In actual implementation, these devices may have other names, provided that functions of the devices are similar to those in the embodiments of this application, the devices fall within the scope of the claims of this application and equivalent technologies thereof.

DESCRIPTION OF EMBODIMENTS

In the specification and claims of this application, terms such as "first", "second", and "third" are intended to distinguish between different objects but do not indicate a particular order.

In the embodiments of this application, a word such as "example" or "for example" is used to give an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a related concept in a specific manner.

For clear and brief description of the following embodiments, a related technology is briefly described first.

According to a headphone-based binaural reproduction method, an HRTF or a BRIR corresponding to a position relationship between a sound source and the head center of a listener is first selected, and then convolution processing is performed on an input signal and the selected HRTF or BRIR, to obtain an output signal. The HRTF describes impact, on sound waves produced by the sound source, of scattering, reflection, and refraction performed by organs such as the head, the torso, and pinnae when the sound waves are propagated to ear canals. The BRIR represents impact of ambient reflections on the sound source. The BRIR can be considered as an impulse response of a system including the sound source, an indoor environment, and binaural (including the head, the torso, and pinnae). The BRIR includes direct sound, early reflections, and late reverberation. The direct sound is sound that is directly propagated from a sound source to a receiver in a form of a straight line without any reflection. The direct sound determines clarity of sound. The early reflections are all reflections that arrive after the direct sound and that are beneficial to quality of sound in the room. The input signal may be an audio signal emitted by a sound source, where the audio signal may be a mono audio signal or a stereo audio signal. The mono may refer to one sound channel through which one microphone is used to pick up sound and one speaker is used to produce the sound. The stereo may refer to a plurality of sound channels. Performing convolution processing on the input signal and the selected HRTF or BRIR may also be understood as performing rendering processing on the input signal. Therefore, the output signal may also be referred to as a rendered output signal or rendered sound. It may be understood that the output signal is an audio signal received by the listener, the output signal may also be referred to as a binaural input signal, and the binaural input signal is sound received by the listener.

Figure 1A:
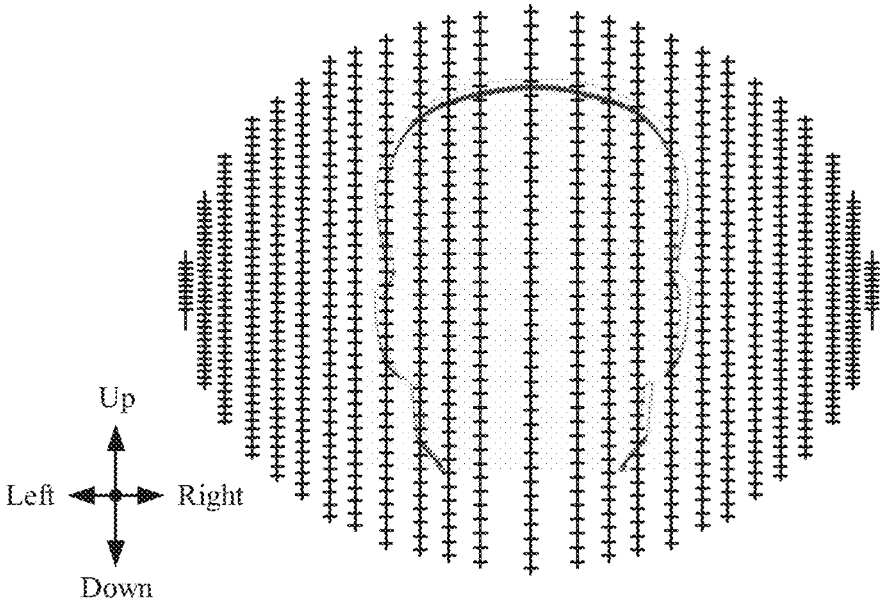
FIG. 1(*a*) and FIG. 1(*b*) are an example diagram of an HRTF library in the conventional technology.
Figure 1B:
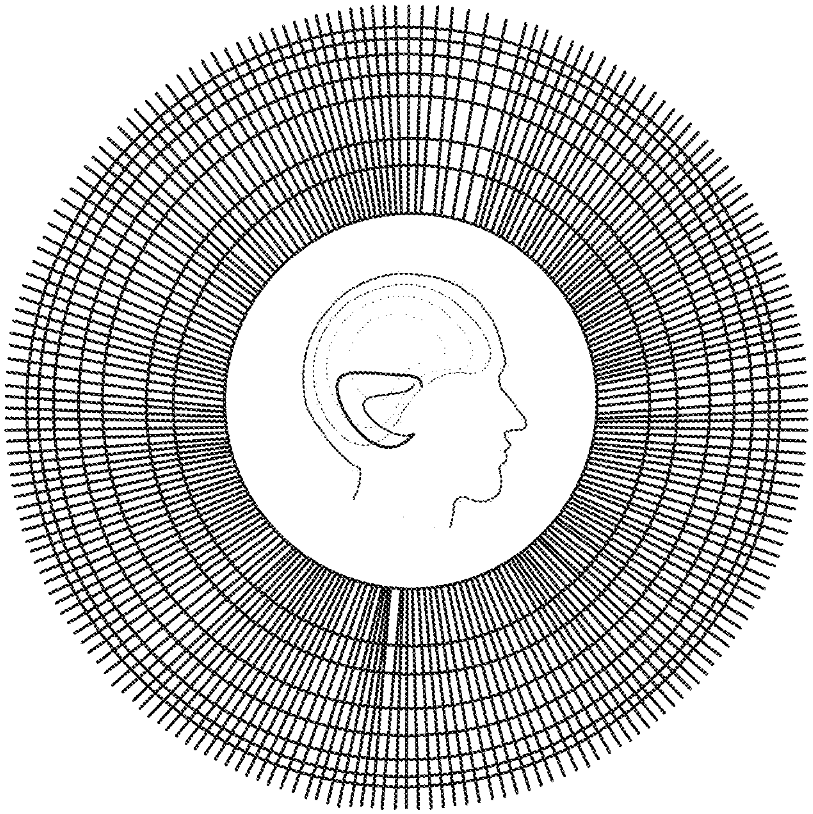

The selecting an HRTF corresponding to a position relationship between a sound source and the head center of the listener may refer to selecting the corresponding HRTF from an HRTF library based on a position relationship between the sound source and the listener. The position relationship between the sound source and the listener includes a distance between the sound source and the listener, an azimuth of the sound source relative to the listener, and a pitch of the sound source relative to the listener. The HRTF library includes the HRTF corresponding to the distance, azimuth, and pitch. FIG. 1(*a*) and FIG. 1(*b*) are an example diagram of an HRTF library in the conventional technology. FIG. 1(*a*) and FIG. 1(*b*) show a distribution density of the HRTF library in two dimensions: an azimuth and a pitch. FIG. 1(*a*) shows HRTF distribution from an external perspective of the front of a listener, where a vertical direction represents a pitch dimension, and a horizontal direction represents an azimuth dimension. FIG. 1(*b*) shows HRTF distribution from an internal perspective of the listener, where a circle represents a pitch dimension, and a radius of the circle represents a distance between the sound source and the listener.

Figure 2:
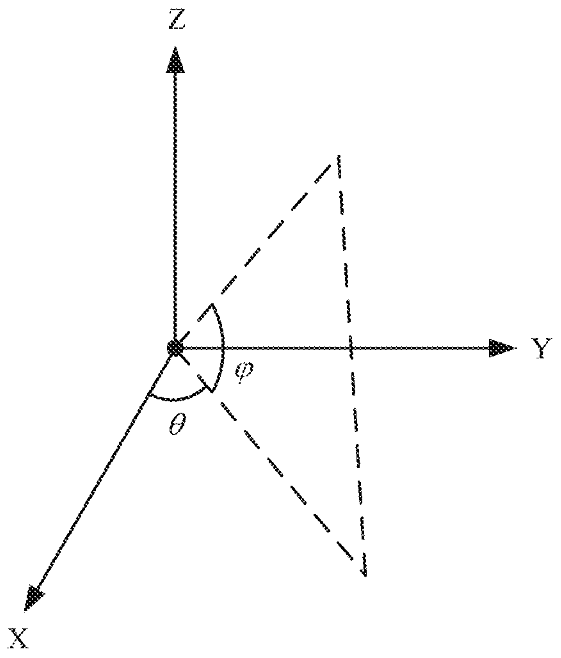
FIG. 2 is an example diagram of an azimuth and a pitch according to an embodiment of this application.

An azimuth refers to a horizontal included angle from a line of a specific point directing to the north to a line directing to the target direction in a clockwise direction. In the embodiments of this application, the azimuth refers to an included angle between a position in the front of the listener and the sound source. As shown in FIG. 2, it is assumed that a position of a listener is an origin 0, a direction represented by an X axis may indicate a forward direction the listener is facing, and a direction represented by a Y axis may represent a direction in which the listener turns counter-clockwise. In the following, it is assumed that a direction in which the listener turns counter-clockwise is a forward direction, that is, if the listener turns more leftward, it indicates that an azimuth is larger.

It is assumed that a plane including the X axis and the Y axis is a horizontal plane, and an included angle between the sound source and the horizontal plane may be referred to as a pitch.

Similarly, for selection of the BRIR corresponding to the position relationship between the sound source and the head center of the listener, refer to the foregoing description of the HRTF. Details are not described again in the embodiments of this application.

Convolution processing is performed on an input signal and a selected HRTF or BRIR to obtain an output signal. The output signal may be determined by using the following formula: $Y(t)=X(t)*HRTF(r,\theta,\varphi)$, where Y(t) represents the output signal, X (t) represents the input signal, HRTF $(r,\theta,\varphi)$ represents the selected HRTF, r represents a distance between the sound source and the listener, $\theta$ represents an azimuth of the sound source relative to the listener, a value range of the azimuth is from 0 degrees to 360 degrees, and $\varphi$ represents a pitch of the sound source relative to the listener.

If the listener only moves but does not turn the head, energy of the output signal may be adjusted, to obtain an adjusted output signal. The energy of the output signal herein may refer to volume of a binaural input signal (sound). The adjusted output signal is determined by using the following formula: $Y'(t)=Y(t)*\alpha$, where Y'(t) represents the adjusted output signal, a represents an attenuation coefficient $$\alpha = \frac{1}{1+x},$$

x represents a difference between a distance of a position of the listener before movement relative to the sound source and a distance of a position of the listener after movement relative to the sound source, or an absolute value of a difference between a distance of a position of the listener before movement relative to the sound source and a distance of a position of the listener after movement relative to the sound source. If the listener remains stationary, and $$\alpha = \frac{1}{1+0} = 1,\ Y'(t) = Y(t)*1,$$

indicating that the energy of the output signal does not need to be attenuated. If the difference between the distance of the position of the listener before movement relative to the sound source and the distance of the position of the listener after movement relative to the sound source is 5, and $$\alpha = \frac{1}{1+5} = \frac{1}{6},\ Y'(t) = y(t)*\frac{1}{6},$$

indicating that the energy of the output signal needs to be multiplied by ⅙.

If the listener only turns the head but does not move, the listener can only sense a direction change of the sound emitted by the sound source, but cannot notably distinguish between volume of the sound in front of the listener and volume of the sound behind the listener. This phenomenon is different from actual feeling that volume of the actually sensed sound is highest when the listener faces the sound source in the real world and that volume of the actually sensed sound is lowest when the listener faces away from the sound source. If the listener listens to the sound for a long time, the listener feels very uncomfortable.

If the listener turns the head and moves, the volume of the sound heard by the listener can be used only to track a position movement change of the listener, but cannot well be used to track a head turning change of the listener. As a result, an auditory perception of the listener is different from an auditory perception in the real world. If the listener listens to the sound for a long time, the listener feels very uncomfortable.

In conclusion, after the listener receives the binaural input signal, if the listener moves or turns the head, volume of sound heard by the listener cannot well be used to track a head turning change of the listener, and real-time performance of position tracking processing is not accurate. As a result, the volume of the sound heard by the listener and position do not match an actual position of the sound source, and an orientation does not match an actual orientation. Consequently, a sense of disharmony in auditory perception of the listener is caused, and the listener feels uncomfortable if listening for a long time. However, a three-dimensional audio system with a relatively good effect requires a full-space sound effect. Therefore, how to adjust an output signal based on a real-time head turning change of the listener and/or a real-time position movement change of the listener to improve an auditory effect of the listener is an urgent problem to be resolved.

In the embodiments of this application, the position of the listener may be a position of the listener in virtual reality. The position movement change of the listener and the head turning change of the listener may be changes relative to the sound source in virtual reality. In addition, for ease of description, the HRTF and the BRIR may be collectively referred to as an audio rendering function in the following.

To resolve the foregoing problems, an embodiment of this application provides an audio signal processing method. A basic principle of the audio signal processing method is as follows: After a current position relationship between a sound source at a current moment and a listener is obtained, a current audio rendering function is determined based on the current position relationship; if the current position relationship is different from a stored previous position relationship, an initial gain of the current audio rendering function is adjusted based on the current position relationship and the previous position relationship, to obtain an adjusted gain of the current audio rendering function; an adjusted audio rendering function is determined based on the current audio rendering function and the adjusted gain; and a current output signal is determined based on a current input signal and the adjusted audio rendering function. The previous position relationship is a position relationship between the sound source at a previous moment and the listener. The current input signal is an audio signal emitted by the sound source, and the current output signal is used to be output to the listener. According to the audio signal processing method provided in this embodiment of this application, a gain of the current audio rendering function is adjusted based on a change in a relative position of the listener relative to the sound source and a change in an orientation of the listener relative to the sound source that are obtained through real-time tracking, so that a natural feeling of a binaural input signal can be effectively improved, and an auditory effect of the listener is improved.

The following describes implementations of the embodiments of this application in detail with reference to the accompanying drawings.

Figure 3:
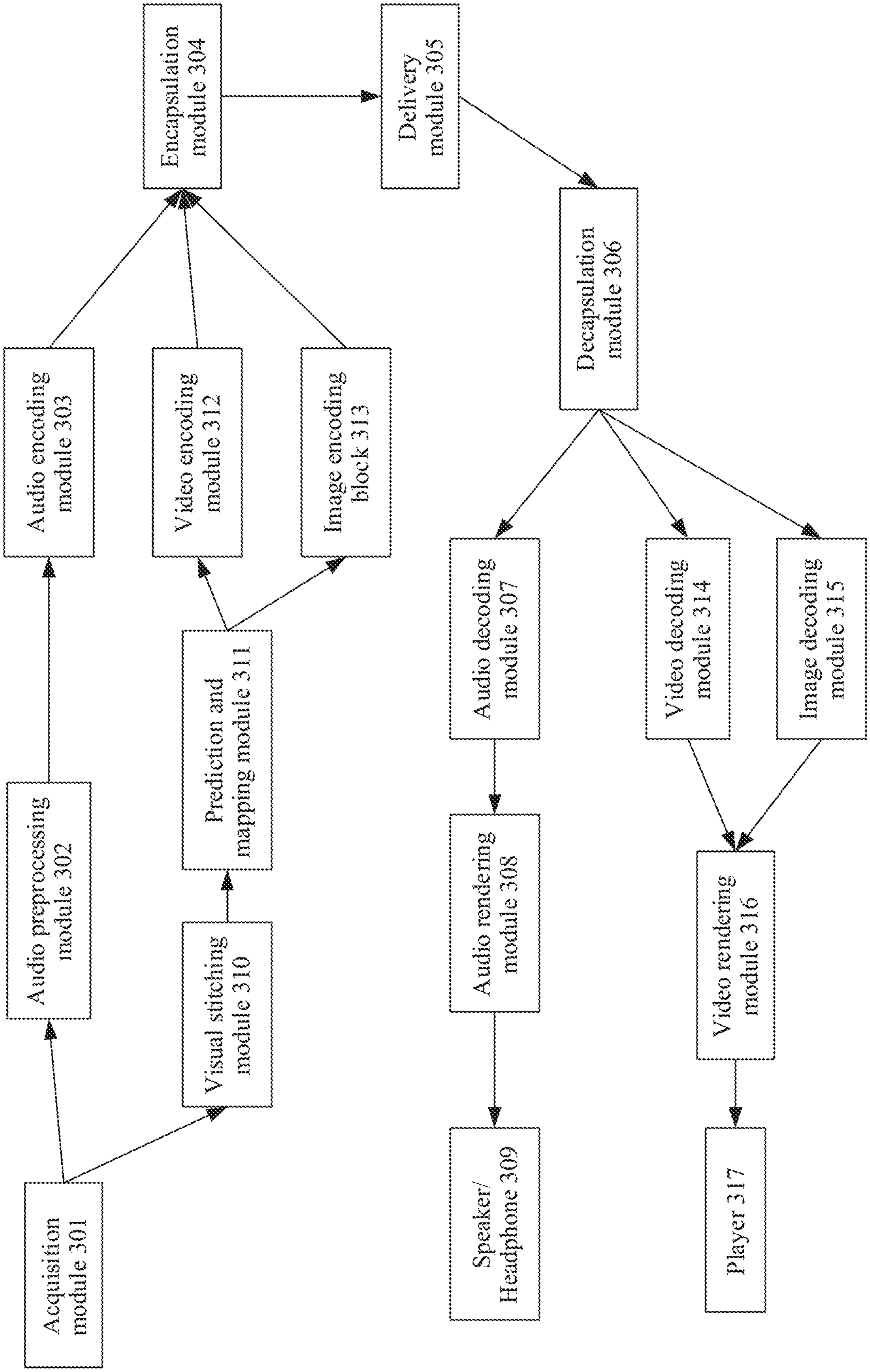
FIG. 3 is an example diagram of composition of a VR device according to an embodiment of this application.

FIG. 3 is an example diagram of composition of a VR device according to an embodiment of this application. As shown in FIG. 3, the VR device includes an acquisition (acquisition) module 301, an audio preprocessing (audio preprocessing) module 302, an audio encoding (audio encoding) module 303, an encapsulation (file/segment encapsulation) module 304, a delivery (delivery) module 305, a decapsulation (file/segment decapsulation) module 306, an audio decoding (audio decoding) module 307, an audio rendering (audio rendering) module 308, and a speaker/headphone (loudspeakers/headphones) 309. In addition, the VR device further includes some modules for video signal processing, for example, a visual stitching (visual stitching) module 310, a prediction and mapping (prediction and mapping) module 311, a video encoding (video encoding) module 312, an image encoding (image encoding) module 313, a video decoding (video decoding) module 314, an image decoding (image decoding) module 315, a video rendering (visual rendering) module 316, and a display (display) 317.

The acquisition module is configured to acquire an audio signal from a sound source, and transmit the audio signal to the audio preprocessing module. The audio preprocessing module is configured to perform preprocessing, for example, filtering processing, on the audio signal, and transmit the preprocessed audio signal to the audio encoding module. The audio encoding module is configured to encode the preprocessed audio signal, and transmit the encoded audio signal to the encapsulation module. The acquisition module is further configured to acquire a video signal. After the video signal is processed by the visual stitching module, the prediction and mapping module, the video encoding module, and the image encoding module, the encoded video signal is transmitted to the encapsulation module.

The encapsulation module is configured to encapsulate the encoded audio signal and the encoded video signal to obtain a bitstream. The bitstream is transmitted to the decapsulation module through the delivery module. The delivery module may be a wired or wireless communication module.

The decapsulation module is configured to: decapsulate the bitstream to obtain the encoded audio signal and the encoded video signal, transmit the encoded audio signal to the audio decoding module, and transmit the encoded video signal to the video decoding module and the image decoding module. The audio decoding module is configured to decode the encoded audio signal, and transmit the decoded audio signal to the audio rendering module. The audio rendering module is configured to: perform rendering processing on the decoded audio signal, that is, process the decoded audio signal according to the audio signal processing method provided in the embodiments of this application; and transmit a rendered output signal to the speaker/headphone. The video decoding module, the image decoding module, and the video rendering module process the encoded video signal, and transmit the processed video signal to the player for playing. For a specific processing method, refer to the conventional technology. This is not limited in this embodiment of this application.

It should be noted that the decapsulation module, the audio decoding module, the audio rendering module, and the speaker/headphone may be components of the VR device. The acquisition module, the audio preprocessing module, the audio encoding module, and the encapsulation module may be located inside the VR device, or may be located outside the VR device. This is not limited in this embodiment of this application.

The structure shown in FIG. 3 does not constitute a limitation on the VR device. The VR device may include components more or fewer than those shown in the figure, or may combine some components, or may have different component arrangements. Although not shown, the VR device may further include a sensor and the like. The sensor is configured to obtain a position relationship between a sound source and a listener. Details are not described herein.

Figure 4:
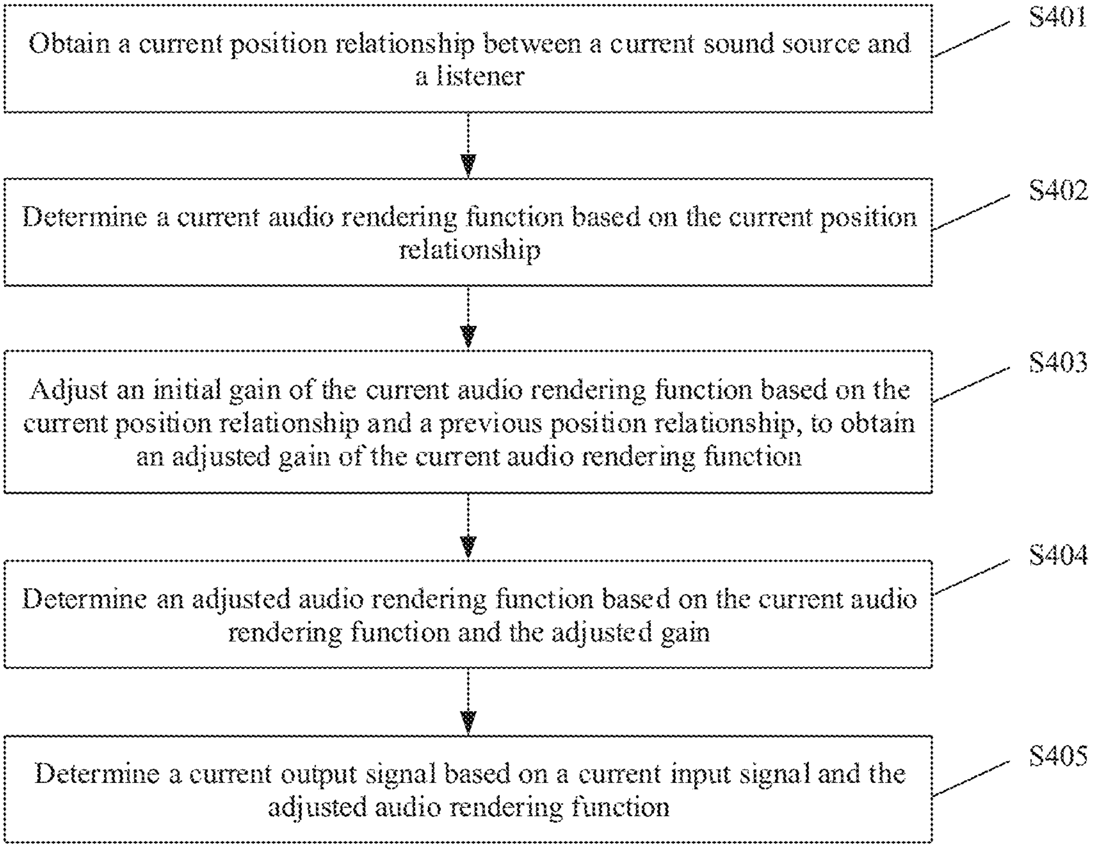
FIG. 4 is a flowchart of an audio signal processing method according to an embodiment of this application.

The following uses a VR device as an example to describe in detail an audio signal processing method provided in an embodiment of this application. FIG. 4 is a flowchart of an audio signal processing method according to an embodiment of this application. As shown in FIG. 4, the method may include the following steps.

S401: Obtain a current position relationship between a current sound source and a listener.

After the listener turns on a VR device and selects a video that needs to be watched, the listener may stay in virtual reality, so that the listener can see an image in a virtual scene and hear sound in the virtual scene. Virtual reality is a computer simulation system that can create and experience a virtual world, is a simulated environment generated by using a computer, and is a system simulation of an entity behavior and an interactive three-dimensional dynamic view including multi-source information, so that a user is immersed in the environment.

When the listener stays in the virtual reality, the VR device can periodically obtain a position relationship between the sound source and the listener. A period for periodically detecting a position relationship between the sound source and the listener may be 50 milliseconds or 100 milliseconds. This is not limited in this embodiment of this application. A current moment may be any moment in the period in which the VR device periodically detects the position relationship between the sound source and the listener. The current position relationship between the current sound source and the listener may be obtained at the current moment.

The current position relationship includes a current distance between the sound source and the listener or a current azimuth of the sound source relative to the listener. "The current position relationship includes a current distance between the sound source and the listener or a current azimuth of the sound source relative to the listener" may be understood as follows: The current position relationship includes the current distance between the sound source and the listener, the current position relationship includes the current azimuth of the sound source relative to the listener, or the current position relationship includes the current distance between the sound source and the listener and the current azimuth of the sound source relative to the listener. Certainly, in some implementations, the current position relationship may further include a current pitch of the sound source relative to the listener. For explanations of the azimuth and the pitch, refer to the foregoing descriptions. Details are not described again in this embodiment of this application.

S402: Determine a current audio rendering function based on the current position relationship.

Assuming that an audio rendering function is an HRTF, the current audio rendering function determined based on the current position relationship may be a current HRTF. For example, an HRTF corresponding to the current distance, the current azimuth, and the current pitch may be selected from an HRTF library based on the current distance between the sound source and the listener, the current azimuth of the sound source relative to the listener, and the current pitch of the sound source relative to the listener, to obtain the current HRTF.

It should be noted that the current position relationship may be a position relationship between the listener and a sound source initially obtained by the VR device at a start moment after the listener turns on the VR device. In this case, the VR device does not store a previous position relationship, and the VR device may determine a current output signal based on a current input signal and the current audio rendering function, that is, may determine, as a current output signal, a result of convolution processing on the current input signal and the current audio rendering function. The current input signal is an audio signal emitted by the sound source, and the current output signal is used to be output to the listener. In addition, the VR device may store a current position relationship.

The previous position relationship may be a position relationship between the listener and the sound source obtained by the VR device at a previous moment. The previous moment may be any moment before the current moment in the period in which the VR device periodically detects the position relationship between the sound source and the listener. Particularly, the previous moment may be the start moment at which the position relationship between the sound source and the listener is initially obtained after the listener turns on the VR device. In this embodiment of this application, the previous moment and the current moment are two different moments, and the previous moment is before the current moment. It is assumed that the period for periodically detecting a position relationship between the sound source and the listener is 50 milliseconds. The previous moment may be a moment from a start moment at which the listener stays in the virtual reality to an end moment of the first period, that is, the $50^{th}$ millisecond. The current moment may be a moment from the start moment at which the listener stays in the virtual reality to an end moment of the second period, that is, the $100^{th}$ millisecond. Alternatively, the previous moment may be any moment before the current moment at which the position relationship between the sound source and the listener is randomly detected after the VR device is started. The current moment may be any moment after the previous moment at which the position relationship between the sound source and the listener is randomly detected after the VR device is started. Alternatively, the previous moment is a moment at which the VR device actively triggers detection before detecting a change in a position relationship between the sound source and the listener. Similarly, the current moment is a moment at which the VR device actively triggers detection after detecting a change in a position relationship between the sound source and the listener, and so on.

The previous position relationship includes a previous distance between the sound source and the listener or a previous azimuth of the sound source relative to the listener. "The previous position relationship includes a previous distance between the sound source and the listener or a previous azimuth of the sound source relative to the listener" may be understood as that the previous position relationship includes the previous distance between the sound source and the listener, the previous position relationship includes a previous azimuth of the sound source relative to the listener, or the previous position relationship includes the previous distance between the sound source and the listener and the previous azimuth of the sound source relative to the listener. Certainly, in some implementations, the previous position relationship may further include a previous pitch of the sound source relative to the listener. The VR device may determine a previous audio rendering function based on the previous position relationship, and determine a previous output signal based on a previous input signal and the previous audio rendering function. For example, the previous output signal may be determined by using the following formula: $Y_1(t)=X_1(t)*HRTF_1(r,\theta,\varphi)$, where $Y_1(t)$ represents the previous output signal, $X_1(t)$ represents the previous input signal, $HRTF_1(r,\theta,\varphi)$ represents the previous audio rendering function, t may be equal to $t_1$, $t_1$ represents the previous moment, r may be equal to $r_1$, $r_1$ represents the previous distance, $\theta$ may be equal to $\theta_1$, $\theta_1$ represents the previous azimuth, $\varphi$ may be equal to $\varphi_1$, $\varphi_1$ represents the previous pitch, and * represents the convolution operation.

Figure 5:
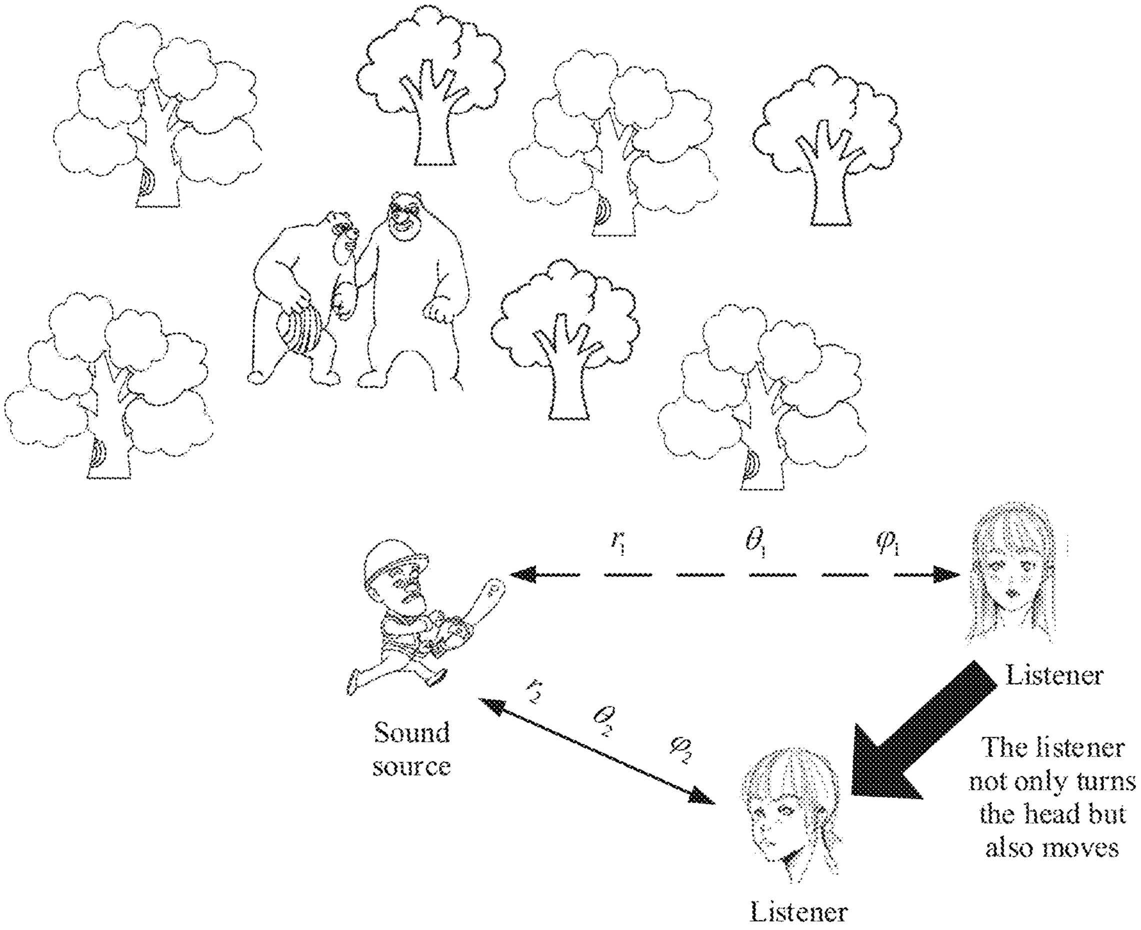
FIG. 5 is an example diagram of head turning and movement of a listener according to an embodiment of this application.

When the listener not only turns the head but also moves, the distance between the sound source and the listener changes, and the azimuth of the sound source relative to the listener also changes. In other words, the current distance is different from the previous distance, the current azimuth is different from the previous azimuth, and the current pitch is different from the previous pitch. For example, the previous HRTF may be $HRTF_1(r_1,\theta_1,\varphi_1)$, and the current HRTF may be $HRTF_2(r_2,\theta_2, \varphi_2)$, where $r_2$ represents the current distance, $\theta_2$ represents the current azimuth, and $\varphi_2$ represents the current pitch. FIG. 5 is an example diagram of head turning and movement of the listener according to this embodiment of this application.

Figure 6:
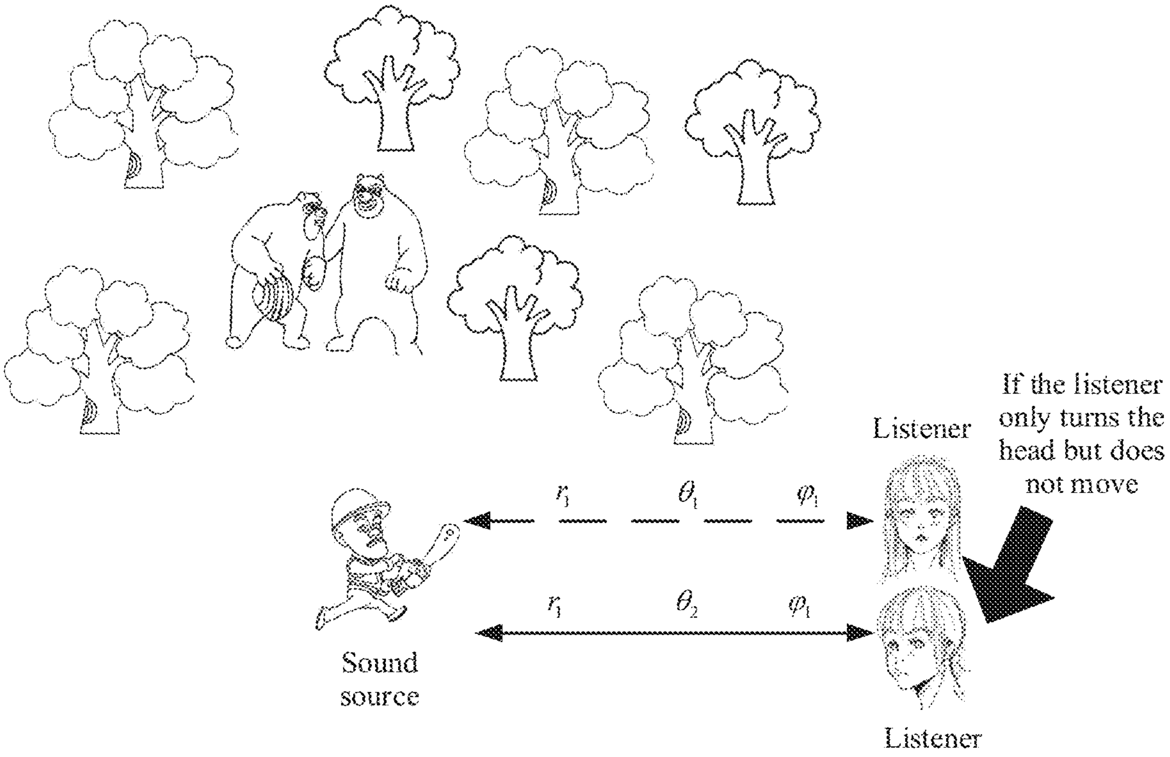
FIG. 6 is an example diagram of head turning of a listener according to an embodiment of this application.

When the listener only turns the head but does not move, the distance between the sound source and the listener does not change, but the azimuth of the sound source relative to the listener changes. In other words, the current distance is the same as the previous distance, but the current azimuth is different from the previous azimuth, and/or the current pitch is different from the previous pitch. For example, the previous HRTF may be $HRTF_1(r_1,\theta,\varphi_1)$, and the current HRTF may be $HRTF_2(r_1,\theta_2,\varphi_1)$ or $HRTF_2(r_1,\theta,\varphi_2)$. Alternatively, the current distance is the same as the previous distance, the current azimuth is different from the previous azimuth, and the current pitch is different from the previous pitch. For example, the previous HRTF may be $HRTF_1(r_1,\theta_1,\varphi_1)$, and the current HRTF may be $HRTF_2(r_1,\theta_2,\varphi_2)$. FIG. 6 is an example diagram of head turning of the listener according to this embodiment of this application.

Figure 7:
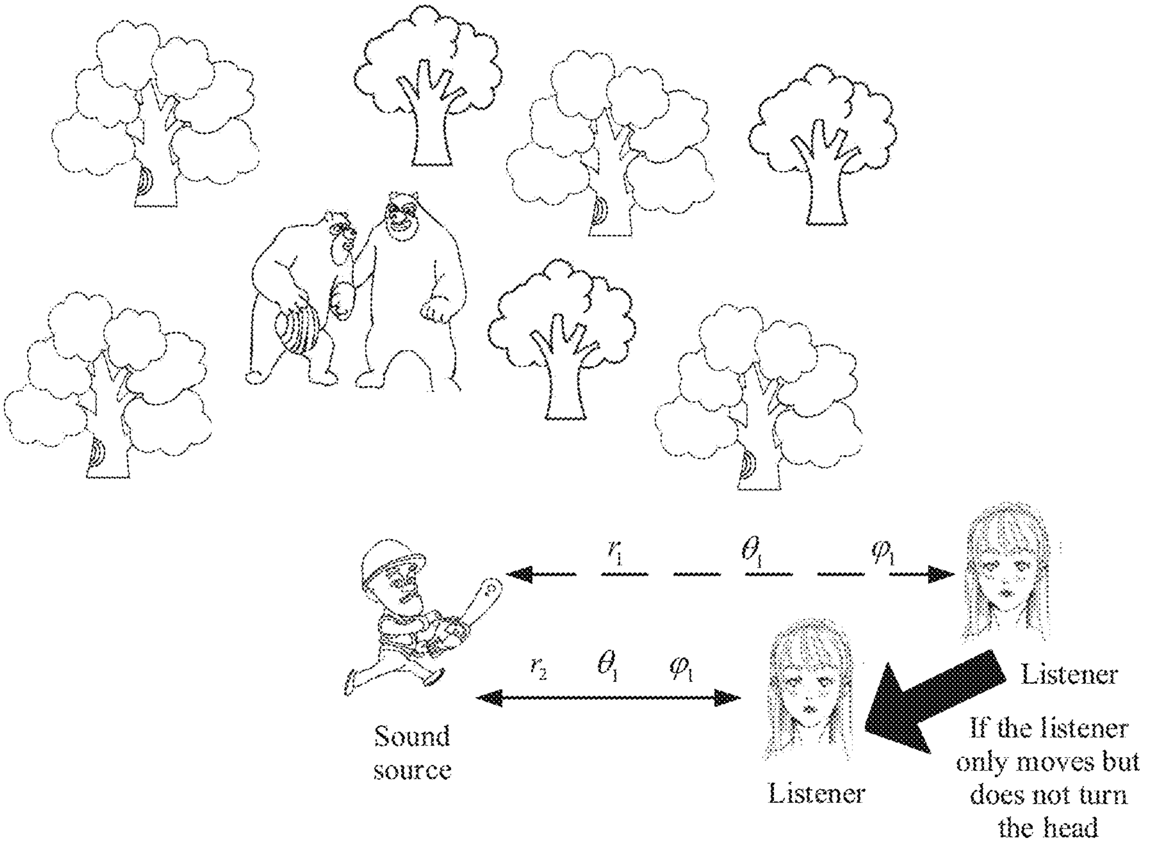
FIG. 7 is an example diagram of movement of a listener according to an embodiment of this application.

When the listener only moves but does not turn the head, the distance between the sound source and the listener changes, but the azimuth of the sound source relative to the listener does not change. In other words, the current distance is different from the previous distance, but the current azimuth is the same as the previous azimuth, and the current pitch is the same as the previous pitch. For example, the previous HRTF may be $HRTF_1(r_1,\theta_1,\varphi_1)$, and the current HRTF may be $HRTF_2(r_2,\theta_1,\varphi_1)$. FIG. 7 is an example diagram of movement of the listener according to this embodiment of this application.

It should be noted that, if the current position relationship is different from the stored previous position relationship, the stored previous position relationship may be replaced by the current position relationship. The current position relationship is subsequently used to adjust the audio rendering function. For a specific method for adjusting the audio rendering function, refer to the following description. If the current position relationship is different from the stored previous position relationship, steps S403 to S405 are performed.

S403: Adjust an initial gain of the current audio rendering function based on the current position relationship and the previous position relationship, to obtain an adjusted gain of the current audio rendering function.

The initial gain is determined based on the current azimuth. A value range of the current azimuth is from 0 degrees to 360 degrees. The initial gain may be determined by using the following formula: $G_1(\theta)=A\times\cos(\pi\times\theta/180)-B$, where $G_1(\theta)$ represents the initial gain, A and B are preset parameters, a value range of A may be from 5 to 20, a value range of B may be 1 to 15, and $\pi$ may be 3.1415926.

It should be noted that, if the listener only moves but does not turn the head, the current azimuth is equal to the previous azimuth. In other words, $\theta$ may be equal to $\theta_1$, where $\theta_1$ represents the previous azimuth. If the listener only turns the head but does not move, or the listener not only turns the head but also moves, the current azimuth is not equal to the previous azimuth, and $\theta$ may be equal to $\theta_2$, where $\theta_2$ represents the current azimuth.

Figure 8:
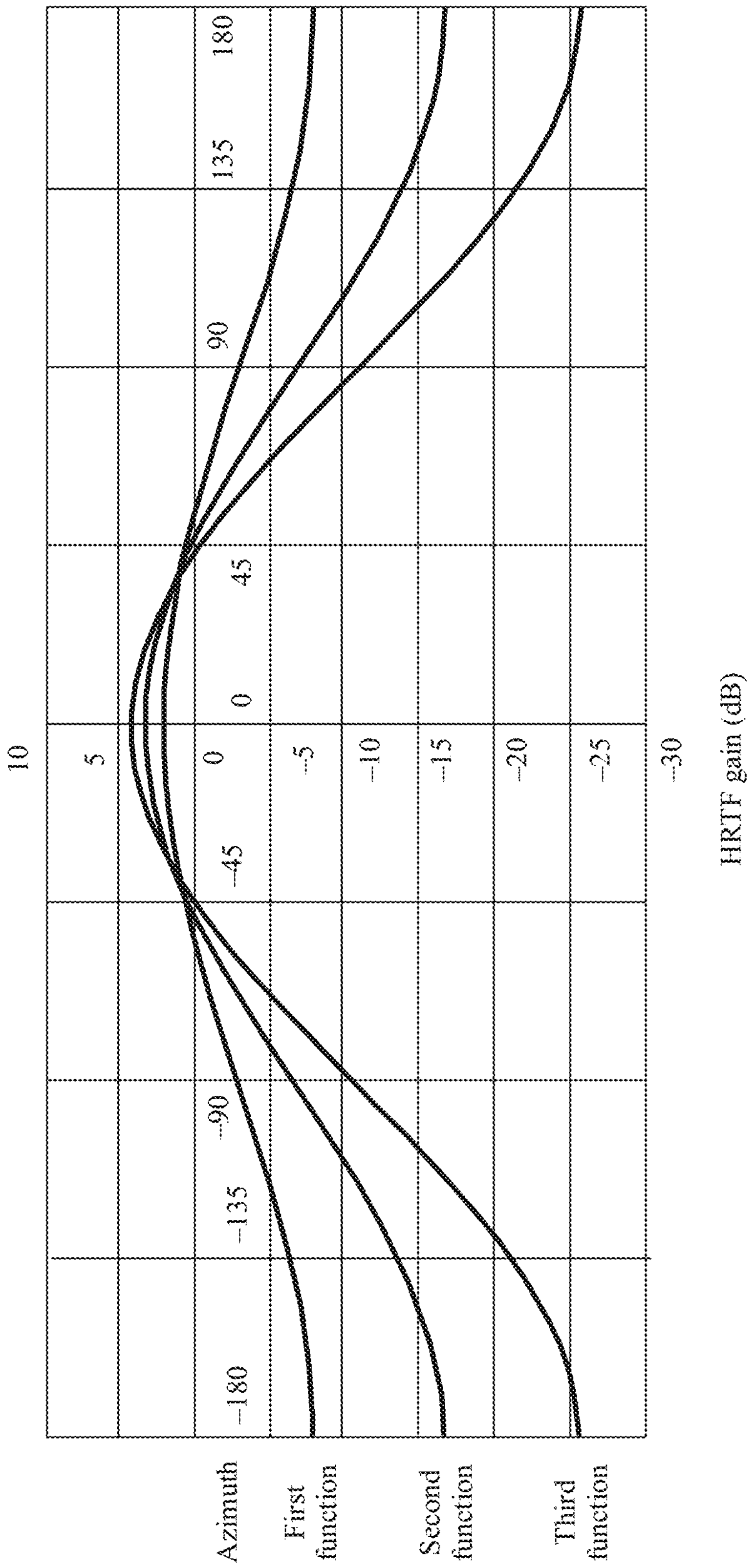
FIG. 8 is an example diagram of gain variation with an azimuth according to an embodiment of this application.

FIG. 8 is an example diagram of gain variation with an azimuth according to this embodiment of this application. Three curves shown in FIG. 8 represent three gain adjustment functions from top to bottom in ascending order of gain adjustment strengths. The functions represented by the three curves are a first function, a second function, and a third function from top to bottom. An expression of the first function may be $G_1(\theta)=6.5\times\cos(\pi\times\theta/180)-1.5$, an expression of the second function may be $G_1(\theta)=11\times\cos(\pi\times\theta/180)-6$, and an expression of the third function may be $G_1(\theta)=15.5\times\cos(\pi\times\theta/180)-10.5$.

Description is provided by using an example of adjustment on a curve representing the third function. When the azimuth is 0, the gain is adjusted to about 5 dB, indicating that the gain increases by 5 dB. When the azimuth is 45 degrees or −45 degrees, the gain is adjusted to about 0, indicating that the gain remains unchanged. When the azimuth is 135 degrees or −135 degrees, the gain is adjusted to about −22 dB, indicating that the gain decreases by 22 dB. When the azimuth is 180 degrees or −180 degrees, the gain is adjusted to about −26 dB, indicating that the gain decreases by 26 dB.

If the listener only moves but does not turn the head, the listener may adjust the initial gain based on the current distance and the previous distance to obtain an adjusted gain. For example, the initial gain is adjusted based on a difference between the current distance and the previous distance, to obtain the adjusted gain. Alternatively, the initial gain is adjusted based on an absolute value of a difference between the current distance and the previous distance, to obtain the adjusted gain.

If the listener moves towards the sound source, it indicates that the listener is getting closer to the sound source. It may be understood that the previous distance is greater than the current distance. In this case, the adjusted gain may be determined by using the following formula: $G_2(\theta)=G_1(\theta)\times(1+\Delta r)$, where $G_2(\theta)$ represents the adjusted gain, $G_1(\theta)$ represents the initial gain, $\theta$ may be equal to $\theta_1$, $\theta_1$ represents the previous azimuth, $\Delta r$ represents an absolute value of a difference between the current distance and the previous distance, $\Delta r$ represents a difference obtained by subtracting the current distance from the previous distance, and x represents a multiplication operation.

If the listener moves away from the sound source, it indicates that the listener is getting farther away from the sound source. It may be understood that the previous distance is less than the current distance. In this case, the adjusted gain may be determined by using the following formula: $G_2(\theta)=G_1(\theta)/(1+\Delta r)$, where $\theta$ may be equal to $\theta_1$, $\theta_1$ represents the previous azimuth, $\Delta r$ represents an absolute value of a difference between the previous distance and the current distance, or $\Delta r$ represents a difference obtained by subtracting the previous distance from the current distance, and/represents a division operation.

It may be understood that the absolute value of the difference may be a difference obtained by subtracting a smaller value from a larger value, or may be an opposite number of a difference obtained by subtracting a larger value from a smaller value.

If the listener only turns the head but does not move, the initial gain is adjusted based on the current azimuth, to obtain the adjusted gain. For example, the adjusted gain may be determined by using the following formula: $G_2(\theta)=G_1(\theta)\times\cos(\theta/3)$, where $G_2(\theta)$ represents the adjusted gain, $G_1(\theta)$ represents the initial gain, $\theta$ may be equal to $\theta_2$, and $\theta_2$ represents the current azimuth.

If the listener not only turns the head but also moves, the initial gain may be adjusted based on the previous distance, the current distance, and the current azimuth, to obtain the adjusted gain. For example, the initial gain is first adjusted based on the previous distance and the current distance to obtain a first temporary gain, and then the first temporary gain is adjusted based on the current azimuth to obtain the adjusted gain. Alternatively, the initial gain is first adjusted based on the current azimuth to obtain a second temporary gain, and then the second temporary gain is adjusted based on the previous distance and the current distance to obtain the adjusted gain. This is equivalent to that the initial gain is adjusted twice to obtain the adjusted gain. For a specific method for adjusting a gain based on a distance and adjusting a gain based on an azimuth, refer to the foregoing detailed description. Details are not described again in this embodiment of this application.

S404: Determine an adjusted audio rendering function based on the current audio rendering function and the adjusted gain.

Assuming that the current audio rendering function is the current HRTF, the adjusted audio rendering function may be determined by using the following formula: $HRTF_2'(r,\theta,\varphi)=HRTF_2(r,\theta,\varphi)\times G_2(\theta)$, where $HRTF_2'(r,\theta,\varphi)$ represents the adjusted audio rendering function, and $HRTF_2(r,\theta,\varphi)$ represents the current audio rendering function.

It should be noted that values of the distance or the azimuth may be different based on a change relationship between a position and the head of the listener. For example, if the listener only moves but does not turn the head, r may be equal to $r_2$, $r_2$ represents the current distance, $\theta$ may be equal to $\theta_1$, $\theta_1$ represents the previous azimuth, $\varphi$ may be equal to $\varphi_1$, and $\varphi_1$ represents the previous pitch. $HRTF_2'(r,\theta,\varphi)$ may be expressed as $HRTF_2'(r_2,\theta_1,\varphi_1)=HRTF_2(r_2,\theta_1,\varphi_1)\times G_2(\theta_1)$.

If the listener only turns the head but does not move, r may be equal to $r_1$, $r_1$ represents the previous distance, θ may be equal to $\theta_2$, $\theta_2$ represents the current azimuth, w may be equal to $\varphi_1$, and $\varphi_1$ represents the previous pitch. $HRTF_2'(r,\theta,\varphi)$ may be expressed as $HRTF_2'(r_1,\theta_2,\varphi_1)=HRTF_2(r_1,\theta_2,\varphi_1)\times G_2(\theta_2)$.

If the listener not only turns the head but also moves, r may be equal to $r_2$, θ may be equal to $\theta_2$, φ may be equal to $\varphi_2$, and $HRTF_2'(r,\theta,\varphi)$ may be expressed as $HRTF_2'(r_2,\theta_2,\varphi_1)=HRTF_2(r_2,\theta_2,\varphi_1)\times G_2(\theta_2)$.

Optionally, when the listener only turns the head but does not move or the listener not only turns the head but also moves, the current pitch may alternatively be different from the previous pitch. In this case, the initial gain may be adjusted based on the pitch.

For example, if the listener only turns the head but does not move, $HRTF_2'(r,\theta,\varphi)$ may be expressed as $HRTF_2'(r_1,\theta_2,\varphi_2)=HRTF_2(r_1,\theta_2,\varphi_2)\times G_2(\theta_2)$. If the listener not only turns the head but also moves, $HRTF_2'(r,\theta,\varphi)$ may be expressed as $HRTF_2'(r_2,\theta_2,\varphi_2)=HRTF_2(r_2,\theta_2,\varphi_2)\times G_2(\theta_2)$.

S405: Determine a current output signal based on the current input signal and the adjusted audio rendering function.

For example, a result of convolution processing on the current input signal and the adjusted audio rendering function may be determined as the current output signal.

For example, the current output signal may be determined by using the following formula: $Y_2(t)=X_2(t)*HRTF_2'(r,\theta,\varphi)$, where $Y_2(t)$ represents the current output signal, and $X_2(t)$ represents the current input signal. For values of r,θ,φ, refer to the description in S404. Details are not described again in this embodiment of this application.

According to the audio signal processing method provided in this embodiment of this application, a gain of a selected audio rendering function is adjusted based on a change in a relative position between the listener relative to the sound source and a change in an orientation of the listener relative to the sound source that are obtained through real-time tracking, so that a natural feeling of a binaural input signal can be effectively improved, and an auditory effect of the listener is improved.

It should be noted that the audio signal processing method provided in this embodiment of this application may be applied to not only a VR device, but also a scenario such as an AR device or a 4G or 5G immersive voice, provided that an auditory effect of a listener can be improved. This is not limited in this embodiment of this application.

In the foregoing embodiments provided in this application, the method provided in the embodiments of this application is described from a perspective of the terminal device. It may be understood that to implement the functions in the method provided in the foregoing embodiments of this application, network elements, for example, the terminal device, include corresponding hardware structures and/or software modules for performing the functions. A person of ordinary skill in the art should easily be aware that algorithm steps in the examples described with reference to the embodiments disclosed in this specification can be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division into functional modules of the terminal device may be performed based on the foregoing method example. For example, division into the functional modules may be performed in correspondence to the functions, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 9:
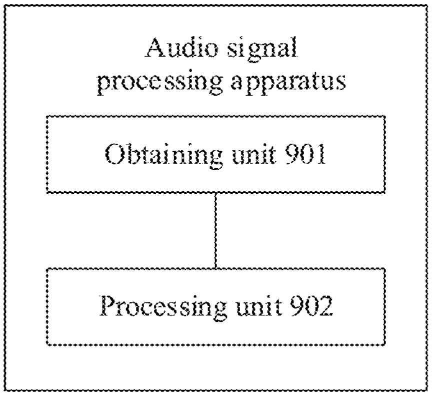
FIG. 9 is an example diagram of composition of an audio signal processing apparatus according to an embodiment of this application.

When division into the functional modules is performed based on corresponding functions, FIG. 9 is a possible schematic diagram of composition of an audio signal processing apparatus in the foregoing embodiments. The audio signal processing apparatus can perform the steps performed by the VR device in any one of the method embodiments of this application. As shown in FIG. 9, the audio signal processing apparatus is a VR device or a communication apparatus that supports a VR device to implement the method provided in the embodiments. For example, the communication apparatus may be a chip system. The audio signal processing apparatus may include an obtaining unit 901 and a processing unit 902.

The obtaining unit 901 is configured to support the audio signal processing apparatus to perform the method described in the embodiments of this application. For example, the obtaining unit 901 is configured to perform or support the audio signal processing apparatus to perform step S401 in the audio signal processing method shown in FIG. 4.

The processing unit 902 is configured to perform or support the audio signal processing apparatus to perform steps S402 to S405 in the audio signal processing method shown in FIG. 4.

It should be noted that all related content of the steps in the foregoing method embodiments may be cited in function descriptions of corresponding functional modules. Details are not described herein again.

The audio signal processing apparatus provided in this embodiment of this application is configured to perform the method in any one of the foregoing embodiments, and therefore can achieve a same effect as the method in the foregoing embodiments.

Figure 10:
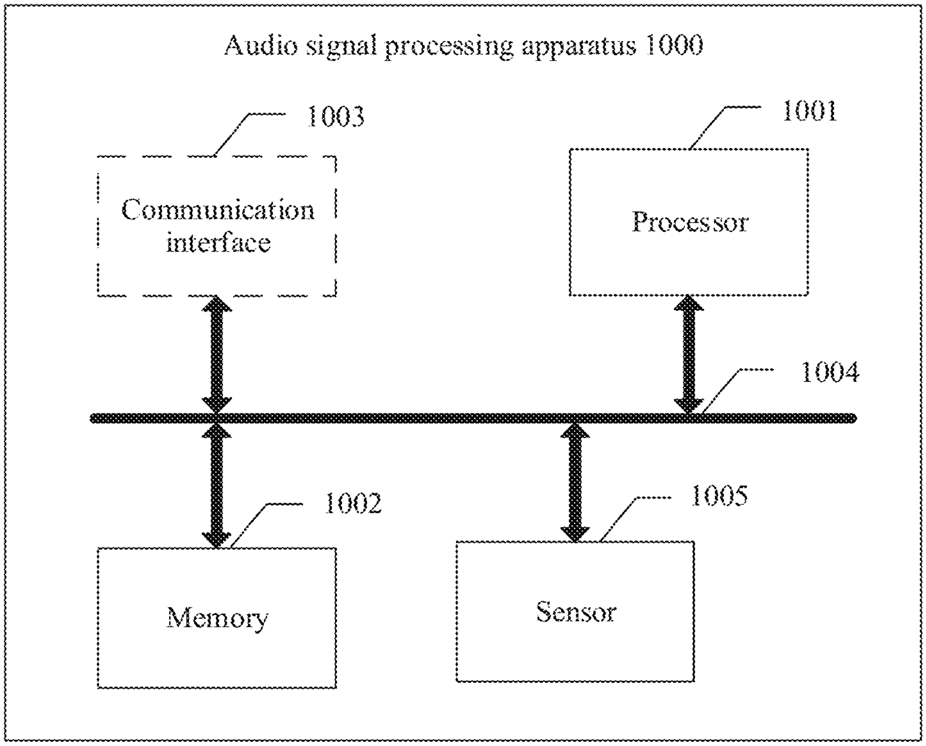
FIG. 10 is an example diagram of composition of another audio signal processing apparatus according to an embodiment of this application.

FIG. 10 shows an audio signal processing apparatus 1000 according to an embodiment of this application. The audio signal processing apparatus 1000 is configured to implement functions of the audio signal processing apparatus in the foregoing method. The audio signal processing apparatus 1000 may be a terminal device, or may be an apparatus in a terminal device. The terminal device may be a VR device, an AR device, or a device with a three-dimensional audio service. The audio signal processing apparatus 1000 may be a chip system. In this embodiment of this application, the chip system may include a chip, or may include a chip and another discrete component.

The audio signal processing apparatus 1000 includes at least one processor 1001, configured to implement functions of the audio signal processing apparatus in the method provided in the embodiments of this application. For example, the processor 1001 may be configured to: after obtaining a current position relationship between a sound source at a current moment and a listener, determine a current audio rendering function based on the current position relationship; if the current position relationship is different from a stored previous position relationship, adjust an initial gain of the current audio rendering function based on the current position relationship and the previous position relationship, to obtain an adjusted gain of the current audio rendering function; determine an adjusted audio rendering function based on the current audio rendering function and the adjusted gain; and determine a current output signal based on a current input signal and the adjusted audio rendering function. The current input signal is an audio signal emitted by the sound source, and the current output signal is used to be output to the listener. For details, refer to the detailed description in the method examples. Details are not described herein again.

The audio signal processing apparatus 1000 may further include at least one memory 1002, configured to store program instructions and/or data. The memory 1002 is coupled to the processor 1001. Coupling in this embodiment of this application is indirect coupling or a communication connection between apparatuses, units, or modules, may be electrical, mechanical, or in another form, and is used for information exchange between the apparatuses, the units, and the modules. The processor 1001 may work with the memory 1002. The processor 1001 may execute the program instructions stored in the memory 1002. At least one of the at least one memory may be included in the processor.

The audio signal processing apparatus 1000 may further include a communication interface 1003, configured to communicate with another device through a transmission medium, so that the apparatuses of the audio signal processing apparatus 1000 can communicate with the another device. For example, if the audio signal processing apparatus is a terminal device, the another device is a sound source device that provides an audio signal. The processor 1001 receives an audio signal through the communication interface 1003, and is configured to implement the method performed by the VR device in the embodiment corresponding to FIG. 4.

The audio signal processing apparatus 1000 may further include a sensor 1005, configured to obtain the previous position relationship between the sound source at a previous moment and the listener, and the current position relationship between the sound source at the current moment and the listener. For example, the sensor may be a gyroscope, an external camera, a motion detection apparatus, an image detection apparatus, or the like. This is not limited in this embodiment of this application.

A specific connection medium between the communication interface 1003, the processor 1001, and the memory 1002 is not limited in this embodiment of this application. In this embodiment of this application, in FIG. 10, the communication interface 1003, the processor 1001, and the memory 1002 are connected through a bus 1004. The bus is represented by using a solid line in FIG. 10. A manner of a connection between other components is merely an example for description, and constitutes no limitation. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware and software modules in the processor.

In the embodiments of this application, the memory may be a nonvolatile memory, for example, a hard disk drive (hard disk drive, HDD) or a solid-state drive (solid-state drive, SSD), or may be a volatile memory (volatile memory) such as a random access memory (random-access memory, RAM). The memory is any other medium that can be used to carry or store expected program code in a form of an instruction or a data structure and that can be accessed by a computer. However, this is not limited thereto. The memory in the embodiments of this application may alternatively be a circuit or any other apparatus that can implement a storage function, and is configured to store program instructions and/or data.

The foregoing descriptions about the implementations allow a person skilled in the art to understand that, for the purpose of convenient and brief description, division into the foregoing functional modules is used as an example for illustration. In actual application, the foregoing functions can be allocated to different functional modules to be implemented based on a requirement, that is, an inner structure of the apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, or may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, and may be located in one place, or may be distributed on a plurality of different places. Some or all of the units may be selected based on actual requirements to achieve the objectives of the solutions of the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

All or some of the methods provided in the embodiments of this application may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An audio signal processing method comprising:

obtaining a current position relationship between a sound source and a listener at a current moment;

obtaining a current audio rendering function based on the current position relationship;

determining that the current position relationship is different from a previous position relationship that has been stored, wherein the previous position relationship is between the sound source at a previous moment and the listener;

adjusting an initial gain of the current audio rendering function based on the current position relationship and the previous position relationship to obtain an adjusted gain of the current audio rendering function, wherein the adjusted gain comprises an azimuthal gain that is a function of azimuthal angles with respect to a forward direction of the listener;

obtaining an adjusted audio rendering function based on the current audio rendering function and the adjusted gain; and obtaining a current output signal based on a current input signal and the adjusted audio rendering function, wherein the current input signal is originated from the sound source, and the current output signal is for playing to the listener, wherein the current position relationship comprises a current distance between the sound source and the listener, and a current azimuth of the sound source relative to the listener, and the previous position relationship comprises a previous distance between the sound source and the listener, and a previous azimuth of the sound source relative to the listener, wherein the current distance is different from the previous distance, and the step of adjusting the initial gain of the current audio rendering function to obtain the adjusted gain comprises:

adjusting the initial gain based on the current distance and the previous distance to obtain the adjusted gain, comprising:

when the previous distance is greater than the current distance, obtaining the adjusted energy gain by using the following formula: $G_2(\theta)=G_1(\theta)\times(1+\Delta r)$, wherein $G_2(\theta)$ represents the adjusted energy gain, $G_1(\theta)$ represents the initial gain, $\theta$ is equal to $\theta_1$, $\theta_1$ represents the previous azimuth, and $\Delta r$ represents an absolute value of the difference between the current distance and the previous distance, or $\Delta r$ represents a difference obtained by subtracting the current distance from the previous distance; and when the previous distance is less than the current distance, obtaining the adjusted energy gain by using the following formula: $G_2(\theta)=G_1(\theta)/(1+\Delta r)$, wherein $\theta$ is equal to $\theta_1$, $\theta_1$ represents the previous azimuth, and $\Delta r$ represents an absolute value of a difference between the previous distance and the current distance, or $\Delta r$ represents a difference obtained by subtracting the previous distance from the current distance.

2. The method according to claim 1, wherein the azimuthal gain is cos $(\theta/3)$, wherein $\theta$ is an azimuthal angle.

3. The method according to claim 1, wherein the current audio rendering function is a head related transfer function (HRTF).

4. The method according to claim 1, wherein the current audio rendering function is a binaural room impulse response (BRIR).

5. The method according to claim 1, wherein the azimuthal gain is $A\times\cos(\pi\times\theta/180)-B$, wherein $\theta$ is an azimuthal angle, A and B are preset parameters, a value range of A is from 5 to 20, and a value range of B is from 1 to 15.

6. An audio signal processing apparatus comprising:

a memory for storing computer executable instructions; and a processor configured to execute the computer-executable instructions to:

obtain a current position relationship between a sound source at a current moment and a listener;

obtain a current audio rendering function based on the current position relationship obtained by the obtaining unit;

determine that the current position relationship is different from a stored previous position relationship, wherein the previous position relationship is between the sound source at a previous moment and the listener;

adjust an initial gain of the current audio rendering function based on the current position relationship obtained by the obtaining unit and the previous position relationship, to obtain an adjusted gain of the current audio rendering function, wherein the adjusted gain comprises an azimuthal gain that is a function of azimuthal angles with respect to a forward direction of the listener;

obtain an adjusted audio rendering function based on the current audio rendering function and the adjusted gain; and obtain a current output signal based on a current input signal and the adjusted audio rendering function, wherein the current input signal is an audio signal originated from the sound source, and the current output signal is for playing to the listener, wherein the current position relationship comprises a current distance between the sound source and the listener, and a current azimuth of the sound source relative to the listener, and the previous position relationship comprises a previous distance between the sound source and the listener, and a previous azimuth of the sound source relative to the listener, wherein the current distance is different from the previous distance, and the processor adjusts the initial gain of the current audio rendering function to obtain the adjusted gain by:

adjusting the initial gain based on the current distance and the previous distance to obtain the adjusted gain, comprising:

when the previous distance is greater than the current distance, obtaining the adjusted energy gain by using the following formula: $G_2(\theta)=G_1(\theta)\times(1+\Delta r)$, wherein $G_2(\theta)$ represents the adjusted energy gain, $G_1(\theta)$ represents the initial gain, $\theta$ is equal to $\theta_1$, $\theta_1$ represents the previous azimuth, and $\Delta r$ represents an absolute value of the difference between the current distance and the previous distance, or $\Delta r$ represents a difference obtained by subtracting the current distance from the previous distance; and when the previous distance is less than the current distance, obtaining the adjusted energy gain by using the following formula: $G_2(\theta)=G_1(\theta)/(1+\Delta r)$, wherein $\theta$ is equal to $\theta_1$, $\theta_1$ represents the previous azimuth, and $\Delta r$ represents an absolute value of a difference between the previous distance and the current distance, or $\Delta r$ represents a difference obtained by subtracting the previous distance from the current distance.

7. The apparatus according to claim 6, wherein the azimuthal gain is cos ($\theta/3$), wherein $\theta$ is an azimuthal angle.

8. The apparatus according to claim 6, wherein the current audio rendering function is a head related transfer function (HRTF).

9. The apparatus according to claim 6, wherein the current audio rendering function is a binaural room impulse response (BRIR).

10. The apparatus according to claim 6, wherein the azimuthal gain is $A\times\cos(\pi\times\theta/180)-B$, wherein $\theta$ is an azimuthal angle, A and B are preset parameters, a value range of A is from 5 to 20, and a value range of B is from 1 to 15.

* * * * *